Patented May 10, 1949

2,469,894

UNITED STATES PATENT OFFICE 2,469,894

METHOD FOR IMPROVING THE SURFACE OF SYNTHETIC RUBBER SPONGE

Thomas H. Rogers, Jr., Akron, Ohio, assignor to Wingfoot Corporation, Akron, Ohio, a corporation of Delaware No Drawing. Application June 12, 1946, Serial No. 676,341

5 Claims. (Cl. 260—84.5)

This invention relates to an improved technique for fabricating porous sponge-like compositions from synthetic rubber latex. More specifically the invention relates to a method of avoiding cracks and other defects on the surface of sponge-like compositions when prepared from synthetic rubber latex.

The preparation of sponge-like compositions from natural rubber is well known and widely used. The procedure usually involves the use of a concentrated latex having a high solids content, for example, 50 percent to 65 percent by weight of rubber. In accordance with the usual procedure, the latex is mixed with latex stabilizing agents, curing agents, gelling agents and other modifying chemicals and vigorously agitated to produce a foam. The soft sponge-like material which results is a weak but self-sustaining solid and retains its shape until the mass is cured by heating at temperatures between 200° and 400° F. If this prior art process, which is quite effective for the preparation of natural rubber or chloroprene rubber sponges, is used to prepare sponges of butadiene copolymer synthetic rubbers, inferior products result due to the formation of cracks or fissures on the surface of the sponge-like masses. The gelled latices of the butadiene synthetic rubber prior to and during the curing operation are not sufficiently strong to withstand the strain of the necessary mechanical operations incidental to normal processing.

The primary purpose of this invention is to provide a method of preparing synthetic rubber sponge-like compositions which are free of surface defects. A further purpose of this invention is to adapt the usual technique for preparing sponges of natural rubber to the preparation of sponges from synthetic rubber of the butadiene copolymer type.

This invention is useful in the preparation of sponge-like compositions from copolymers of butadiene-1,3 and other polymerizable monoolefinic compounds. The copolymers are preferably those of 50 to 80 percent butadiene-1,3 and 20 to 50 percent of compounds such as styrene, acrylonitrile, methyl methacrylate, ethyl fumarate, vinylidene chloride, vinyl acetate, and homologues thereof.

The preparation of the synthetic rubber latex is effected by emulsion polymerization in the manner well known to the prior art. The latex, which preferably is one of high rubber content, for example 50 to 65 percent which may be prepared directly by emulsion polymerization or by creaming, or otherwise concentrating low solids latices. Conventional modifying agents such as vulcanizing agents, anti-oxidants, emulsion stabilizers, thickening agents, accelerators, gelling agents, fillers, coloring agents, and other modifying materials are added to the latex prior to or during the sponge formation operation.

The principal vulcanizing agent which is widely used in the art is sulfur. Other vulcanizing agents such as selenium, tellurium, amines, and diazo derivatives are known, but are not widely used.

The emulsifying agents used in the practice of this invention are the soaps, and other organic chemical compounds which have both hydrophilic and hydrophobic radicals so as to promote the mixing of oil and water miscible ingredients in the latex and stabilize the emulsion so formed. A wide variety of these compounds is known and available commercially. Potassium oleate soap, rosinate soaps, sodium stearate, potassium lauryl sulfate, sulfonated hydrocarbons, and sodium alkyl naphthalene sulfate are examples of typical wetting agents useful in stabilizing the latex emulsions. The same stabilizing agents serve a further function in maintaining the froth or foam in stable form until the curing operation is completed.

Frequently it is desirable to increase the viscosity of the latex by adding a thickening agent, such as casein, gum tragacanth or water glass.

It is necessary to add a gelling agent which induces the formation of a stable, solid sponge. Sodium fluorosilicate ($Na_2SiF_6$) is the principal gelling agent, but ammonium sulfate, ammonium nitrate, calcium sulfate, and 2-nitro-2-methyl-1-propanol are examples of other gelling agents which may be used. Frequently it is desirable to use two or more gelling agents; for example, sodium fluosilicate and ammonium sulfate are frequently used simultaneously.

The anti-oxidants and accelerators used are those which are conventional in the rubber art. For example, the anti-oxidant may be phenyl-beta-naphthylamine, di-beta-naphthyl-para-phenylene-diamine, and the heptyl diphenyl amines. Suitable accelerators are the zinc salt of mercapto-benzo-thiazole, benzo-thiazyl disulfide, ethyl zimate, and tetramethyl thiuram disulfide.

Other modifying agents may be added, for example, castor oil, which improves the elastic properties of the sponge by serving as a lubricant, reinforcing agents such as carbon black, magnesium oxide, and calcium silicate which cause a strengthening or stiffening of the sponge, and various dyes and coloring matters which improve the appearance of the composition.

The preferred prior art method of preparing sponge compositions involves the preliminary addition of the various anti-oxidants, accelerators and vulcanizing agents to the synthetic rubber latex. The compounded latex is then vigorously agitated to produce a froth or foam while the emulsion stabilizing agents are being added. After the latex has been frothed to a satisfactory extent, the gelling agents are added and thoroughly mixed with the emulsion. The composition is then poured into a suitable mold. Once in the mold, the sponge rubber composition is dressed or scraped to remove superficial irregularities and then allowed to gel, this usually taking place within a few minutes after pouring. In accordance with the usual method of fabricating sponge-like compositions, the formed sponge is then heated to a vulcanizing temperature, preferably between 200° F. and 400° F., for a sufficient time to cure the composition.

In accordance with this invention the usual method of preparing sponges is modified by treating the surface of the sponge composition prior to the gelling with steam. This may be done by moving the poured sponge compositions on a conveyor through a chamber or other enclosure in which an atmosphere of steam exists. If desired, the sponge composition may be sprayed with steam from a series of fine steam jets, due care being taken to avoid disruption of the surface of the sponge. The mechanism of the physical or chemical action effected by the steam treatment of the sponge surface is not completely understood. It may be that a thin, tough film is formed on the surface of the sponge composition. At any rate, the sponges which have been subjected to the steam treatment are substantially free of the fractures and cracks which are usually present when the steam treatment is not used. Subsequent to the steam treatment the sponge compositions are permitted to gel, and the gelled sponges then are vulcanized in the usual manner as set forth above.

In the practice of this invention it is desirable to steam-treat only the surface of the composition which is normally exposed to the air while maintaining the bulk of the sponge-like mass at lower temperatures. The temperature of the steam atmosphere will usually be substantially below 100° C. due to the presence of air mixed in the steam. The actual measured temperature of the surface during treatment is between 40° C. and 90° C., and preferably between 50° C. and 80° C. Temperatures in excess of 100° C. may injure the composition and temperatures below 30° C. are ineffective. The treatment of foam synthetic rubber latices in accordance with this invention should not be confused with heat gelation procedures because in the invention temperatures in excess of 100° C. are not used and hot air or other heated gas will not produce the beneficial effect.

Further details of the preparation of sponges in accordance with this invention are set forth in the following examples:

Example 1

The following formulation was used to prepare a sponge-like composition:

| | Parts by weight |
|---|---|
| Antioxidant dispersion | 4 |
| Copolymer latex (70% butadiene, 30% acrylonitrile, 56% solids) | 357 |
| Potassium oleate soap (20% water solution) | 22 |
| Casein (12.5% water solution) | 3.2 |
| Sulfur dispersion | 10.9 |
| Accelerator A dispersion | 1.25 |
| Accelerator B dispersion | 1.43 |
| Ammonium sulfate (20% water solution) | 8 |
| Castor oil emulsion | 8 |
| Zinc oxide dispersion | 8 |
| Sodium fluoro-silicate dispersion | 7 |

The latex, which contained 54.6 percent of copolymer, 1.12 percent rosin soap and 0.28 percent of potassium oleate soap, was placed in a receptacle provided with a high speed stirring mechanism. While stirring the latex slowly, the antioxidants, the emulsifying agents, and the casein were added. The sulfur and the accelerators were combined and then added and thoroughly mixed. The gelling agent was then added and the speed of the whip increased to promote the formation of the latex foam. After the volume of the latex had increased to a maximum, the zinc oxide and the castor oil emulsion were added and agitation continued for 1.5 minutes. The agitation was then stopped and the foamed latex was poured into a flat pan of dimensions 24.75 cm. x 24.75 cm. x 1.25 cm. The surface of the sponge composition was leveled with a straight edge. The surface of the sponge composition was then sprayed lightly with low-pressure steam in such a manner that the surface was not disfigured. In about 1.5 minutes after pouring the sponge, the surface began to gel. After the gelation was complete, the slab was cured in a steam autoclave at 20 pounds per square inch gauge pressure for 20 minutes. The resulting sponge was found to have an excellent surface free of cracks or other defects.

Another sponge was prepared in identical fashion without the steam treatment. It was found that the cured sponge had several large cracks, some of which extended more than half way through the thickness.

Example 2

A sponge-like composition was made from a butadiene-styrene synthetic latex using the following formulation:

| | Parts by weight |
|---|---|
| Copolymer latex (60% butadiene, 40% styrene, 62.1% solids) | 322 |
| Antioxidant dispersion | 4 |
| Potassium oleate soap (20% water solution) | 24 |
| Ammonium hydroxide (28% water solution) | 1.5 |
| Casein (12.5% water solution) | 3.2 |
| Sulfur dispersion | 8.18 |
| Accelerator A dispersion | 7.5 |
| Accelerator B dispersion | 5.71 |
| Ammonium sulfate (20% water solution) | 3 |
| Zinc oxide dispersion | 12.3 |
| Sodium fluoro-silicate dispersion | 20.2 |

This latex which contained 60.54 percent of copolymer, 1.24 percent rosin soap and 0.32 percent potassium oleate soap was converted to sponge rubber using the apparatus described in the preceding example. The synthetic latex was first mixed with the anti-oxidant, accelerator and vulcanizing dispersions and then with the potassium oleate soap and casein solutions. The speed of the mixing apparatus was then increased until the latex was whipped to a light froth. The casein, castor oil emulsion, zinc oxide dispersion, and the sodium fluoro silicate were then added while continuing the beating. The compounded froth was then poured into a flat pan and permitted to gel. The surface of the composition was then levelled by scraping with a straight-edge. The surface of the sponge was then sprayed gently with a jet of low pressure steam so as not to disturb the surface. The gelling began within two minutes after the surface treatment was completed. After the gelation was complete and the soap foam had disappeared from the surface of the sponge composition it was cured in an atmosphere of steam for 20 minutes at a temperature of 254° F. By this method a sponge was produced which was free of surface defects.

A control sample was made using the identical procedure except that the steam treatment step was omitted. The sponge composition thereby produced had several surface cracks caused by the shrinking of the sponge.

Accelerator A, used in the preceding examples, was a water dispersion containing 40 percent of a mixture of 9 parts by weight of the zinc salt of mercaptobenzothiazole and 1 part of paraffin having a melting point of 123° to 135° F.

The anti-oxidant was an emulsion containing 50 percent by weight of a mixture of monoheptyl diphenyl amine and diheptyl diphenyl amine, 5 percent of a 20 percent solution of sodium lauryl sulfate and 20 percent of a 12.5 percent water solution of casein containing 0.65 percent of cresylic acid and 3.75 percent of potassium hydroxide.

The zinc oxide dispersion contained 50 percent of zinc oxide, 1 percent gum acacia, 1 percent of ammonium hydroxide and the balance water.

Accelerator B was a water dispersion containing 35 percent zinc diethyl dithiocarbamate, 0.7 percent gelatin and 1.05 percent ammonium hyroxide.

The sodium fluoro-silicate was used as a water dispersion of 22.7 percent $Na_2SiF_6$ and 2.3 percent of bentonite.

The casein oil emulsion was an aqueous emulsion containing 60 percent of casein oil and 12 percent of potassium oleate soap.

The sulfur dispersion in the above examples contained 55 percent of sulfur in aqueous dispersion and 2 percent of a commercial stabilizing agent.

Although the invention has been described with respect to specific examples, it is not intended that the details thereof shall be construed as limitations upon the scope of the invention except to the extent incorporated in the following claims.

I claim:

1. In the method of preparing sponge-like compositions by frothing a latex of a copolymer of 50 to 80 percent of butadiene-1,3 and from 20 to 50 percent of acrylonitrile, compounding the frothed latex, gelling the latex, and vulcanizing the gelled latex, the improvement which comprises heating the surface of the frothed latex, prior to gelling, to a temperature between 50° C. and 80° C. by contacting it with steam.

2. In the method of preparing sponge-like compositions by frothing a latex of a copolymer of 50 to 80 percent of butadiene-1,3 and from 20 to 50 percent of styrene, compounding the frothed latex, gelling the latex, and vulcanizing the gelled latex, the improvement which comprises heating the surface of the frothed latex, prior to gelling, to a temperature between 50° C. and 80° C. by contacting it with steam.

3. In a method of preparing a sponge-like composition by frothing a latex of a copolymer of butadiene-1,3 and a polymerizable mono-olefinic monomer, the improvement which comprises heating the surface of the frothed mass, prior to gelling, to a temperature between 40° C. and 90° C. by contacting it with steam.

4. In a method of preparing a sponge-like composition by frothing a latex of a copolymer of a butadiene-1,3 and acrylonitrile, the improvement which comprises heating the surface of the frothed mass, prior to gelling, to a temperature between 40° and 90° C. by contacting it with steam.

5. In a method of preparing a sponge-like composition by frothing a latex of a copolymer of butadiene-1,3 and styrene, the improvement which comprises heating the surface of the frothed mass, prior to gelling, to a temperature between 40° C. and 90° C. by contacting it with steam.

THOMAS H. ROGERS, Jr.

REFERENCES CITED

The following references are of record in the file of this patent:

UNITED STATES PATENTS

| Number | Name | Date |
| --- | --- | --- |
| 2,200,847 | Madge et al. | May 14, 1940 |